(12) United States Patent
Wu et al.

(10) Patent No.: US 8,564,566 B2
(45) Date of Patent: Oct. 22, 2013

(54) INPUT DEVICE USING PROJECTOR

(75) Inventors: Kun-Tsan Wu, Shindian (TW); Li-Wen Tien, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 481 days.

(21) Appl. No.: 12/955,025

(22) Filed: Nov. 29, 2010

(65) Prior Publication Data

US 2011/0304580 A1 Dec. 15, 2011

(30) Foreign Application Priority Data

Jun. 11, 2010 (CN) .......................... 2010 1 0198967

(51) Int. Cl.
*G06F 3/045* (2006.01)
(52) U.S. Cl.
USPC .......................................... 345/174; 345/168

(58) Field of Classification Search
USPC .................................. 345/156, 168, 169, 173
See application file for complete search history.

(56) References Cited

U.S. PATENT DOCUMENTS

| | | | |
|---|---|---|---|
| 2002/0075240 A1* | 6/2002 | Lieberman et al. | 345/170 |
| 2008/0088587 A1* | 4/2008 | Pryor | 345/158 |
| 2010/0182236 A1* | 7/2010 | Pryor | 345/158 |
| 2011/0084914 A1* | 4/2011 | Zalewski | 345/173 |
| 2011/0098083 A1* | 4/2011 | Lablans | 455/556.1 |

* cited by examiner

*Primary Examiner* — Ricardo L Osorio
(74) *Attorney, Agent, or Firm* — Altis & Wispro Law Group, Inc.

(57) ABSTRACT

An input device includes a base, a touchscreen, and a projector. The base defines a receiving slot. The touchscreen is secured to the base. The projector can be pivotally received in the receiving slot. The projector includes a holder and a lens. One end of the holder is pivotally secured to the base, and the lens is secured to the other end of the holder. The lens can project a keyboard image on the touchscreen to identify input locations.

16 Claims, 8 Drawing Sheets

INPUT DEVICE USING PROJECTOR

BACKGROUND

1. Technical Field

The disclosure generally relates to input devices and, particularly, to an input device using a projector.

2. Description of Related Art

Input devices such as keyboards are widely used with personal computers (PCs), game devices, and others. Many keyboards include a number of buttons elastically secured to the base. When the keyboard is used, manual pressure is required to register the input.

Therefore, there is room for improvement within the art.

BRIEF DESCRIPTION OF THE DRAWINGS

Many aspects of the exemplary embodiment of an input device can be better understood with reference to the following drawings. The components in the drawings are not necessarily drawn to scale, the emphasis instead being placed upon clearly illustrating the principles of the input device for electronic device. Moreover, in the drawings, like reference numerals designate corresponding parts throughout the several views, in which.

DETAILED DESCRIPTION

The disclosure is illustrated by way of example and not by way of limitation in the accompanying drawings. It should be noted that references to "an" or "one" embodiment in this disclosure are not necessarily to the same embodiment, and such references can include the meaning of "at least one" embodiment where the context permits.

Figure 1:
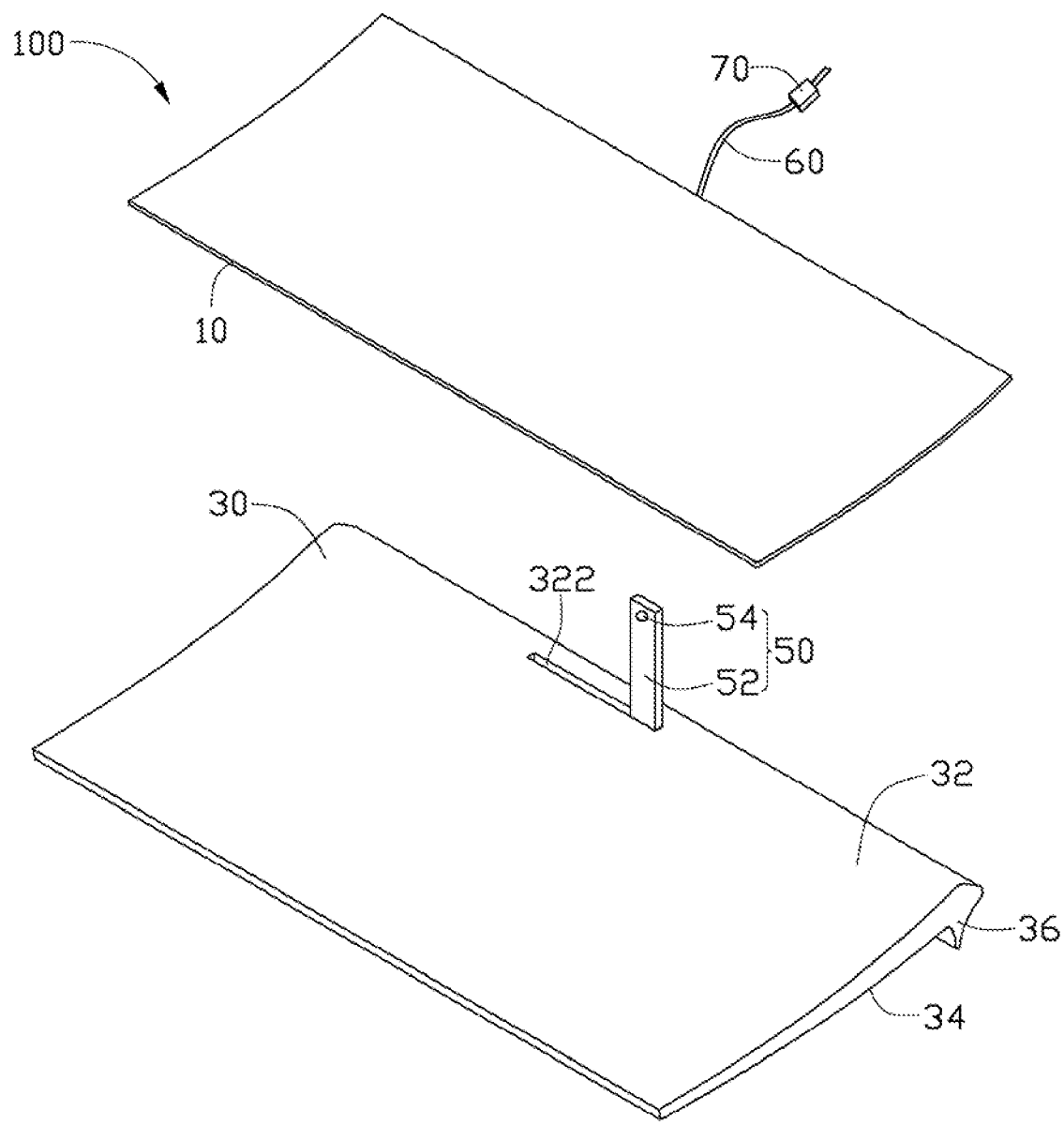
FIG. 1 is an exploded, isometric view of an input device of a first exemplary embodiment.

FIG. 1 illustrates an input device 100 for an electronic device (not shown), such as a personal computer (PC) in a first exemplary embodiment. The input device 100 includes a touchscreen 10, a base 30, a projector 50, and a cable 60. The touchscreen 10 is secured to the base 30, and the projector 50 is pivotally secured to the base 30 for projecting a keyboard image on the panel 10 to identify key-input locations. The cable 60 is electrically connected to the touchscreen 10. Alternatively, the cable 60 can be replaced by a wireless device, such as a Bluetooth device, infrared transmission device, or other. The input device 100 can further include a control module 70 for electrically connecting to the projector 50 to control the keyboard image projected on the touchscreen 10. The control module 70 can store a number of different keyboard images, such as a QWERTY keyboard image, a Greek letters keyboard image, or a numeric keypad image. The control module 70 can provide selection of a keyboard image from a collection of different keyboard images.

Figure 2:
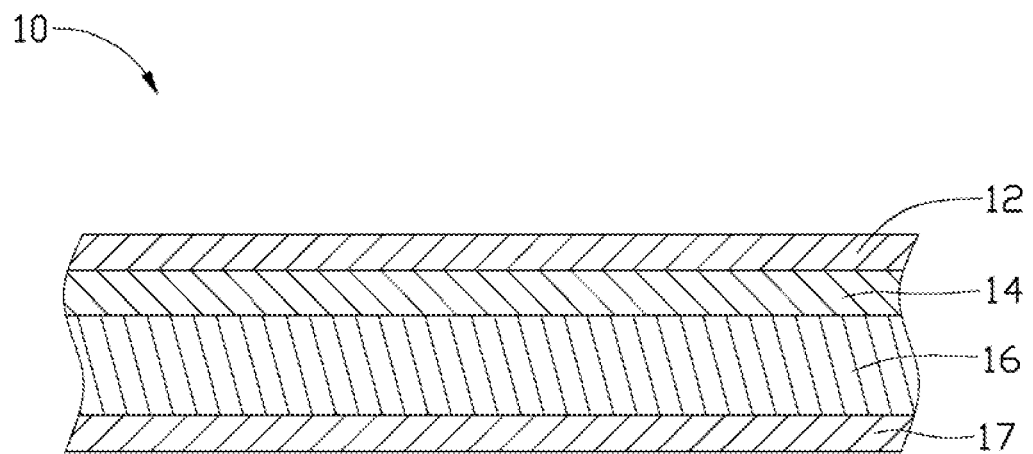
FIG. 2 is a cross section of a touchscreen of FIG. 1.

Referring to FIG. 2, the touchscreen 10 may be a transparent capacitive touchscreen. The touchscreen 10 includes a transparent protective layer 12, a first conducting layer 14, a transparent substrate 16, and a second conducting layer 17. The transparent protective layer 12 may be silicon dioxide (SiO) or polyethylene terephthalate (PET). The first conducting layer 14 is secured to the transparent protective layer 12, and may be indium tin oxide (ITO), aluminum-doped zinc oxide, or cadmium oxide (CdO). The first conducting layer 14 detects a contact position. The transparent substrate 16 is attached to the first conducting layer 14, and may be transparent glass or transparent plastic. The second conducting layer 17 is coated on the transparent substrate 16, and may be transparent conducting material to protect the transparent sub strate16.

Figure 3:
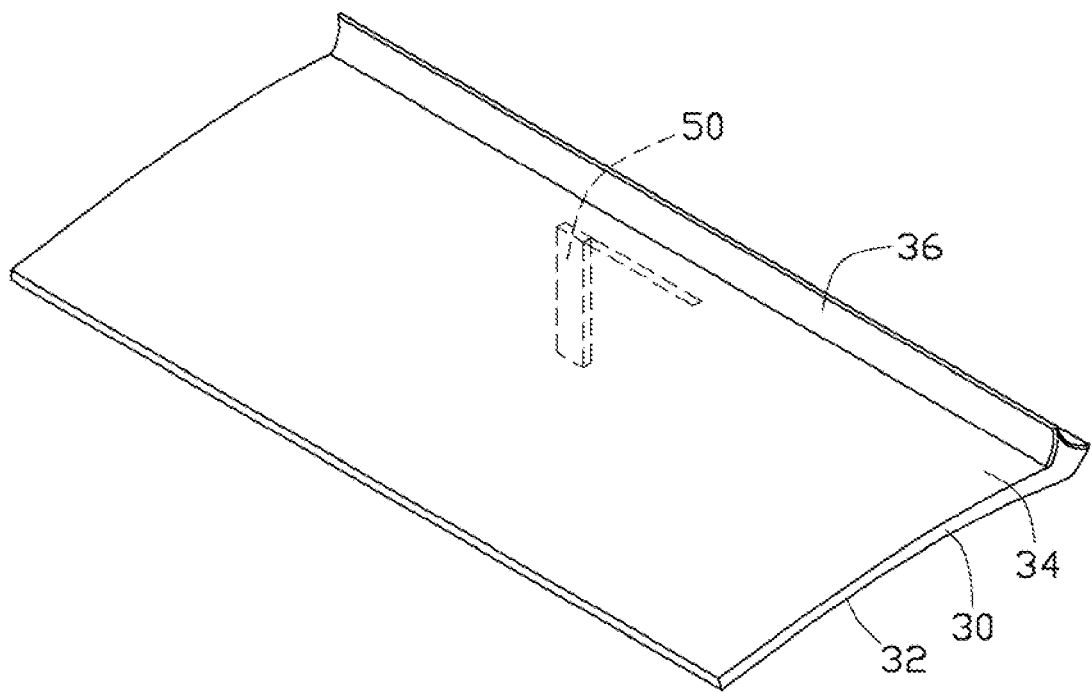
FIG. 3 is an isometric view of a base of FIG. 1, but viewed from another aspect.

Referring to FIGS. 1 and 3, the base 30 includes a first surface 32 and a second surface 34 opposite to the first surface 32. A thickness of the base 30 increases from the front end to the rear end as shown in FIG. 1. A leg portion 36 projects from the rear end of the second surface 34 so that the base 30 is generally L-shape. When the input device 100 is used, the base 30 provides an inclined surface for comfort. A receiving slot 322 defined in the first surface 32 receives the projector 50.

As shown in FIG. 1, the projector 50 includes a holder 52 and a lens 54. One end of the holder 52 pivots on the base 30, with the opposite end bearing lens 54. The holder 53 can pivot to be received in the receiving slot 322 for protection when not in use.

Figure 4:
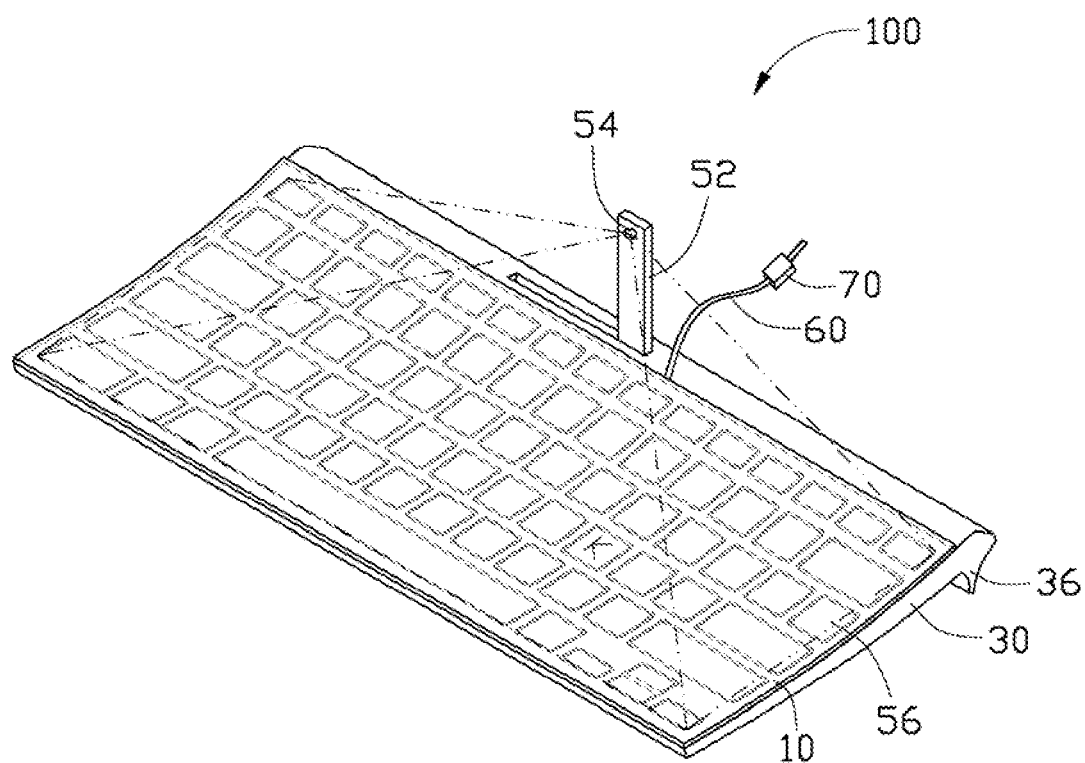
FIG. 4 is an assembled, isometric view of the input device of FIG. 1 showing a first keyboard image.
Figure 5:
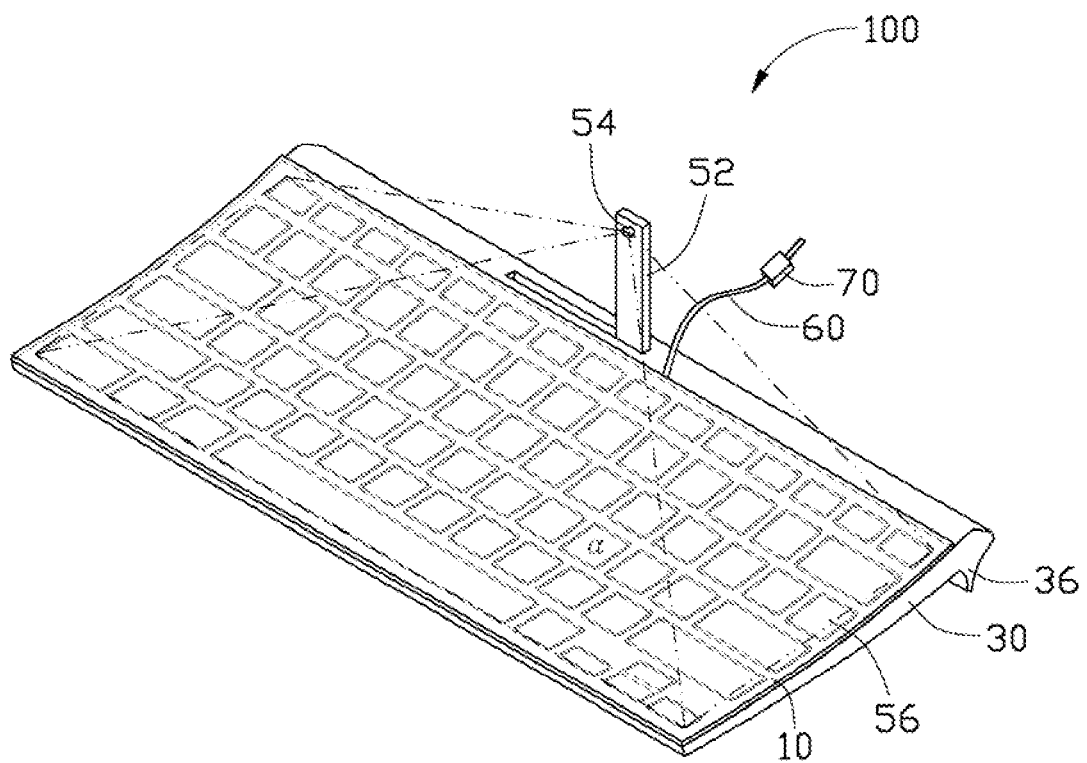
FIG. 5 is similar to FIG. 4, but showing another keyboard image.

When the input device 100 is powered on, the holder 52 is pivoted out of the receiving slot 322 substantially perpendicular to surface, as shown in FIG. 4, and the lens 54 can project, for example, a QWERTY keyboard image on the touchscreen 10 to identify key-input locations thereon. When the button (not shown) on the control module 70 is pressed to select another keyboard image for the projector 50, such as Greek letters as shown in FIG. 5, another keyboard image is projected on the touchscreen 10 to identify key input locations, so that input device 100 can be input information for the electronic device.

Figure 6:
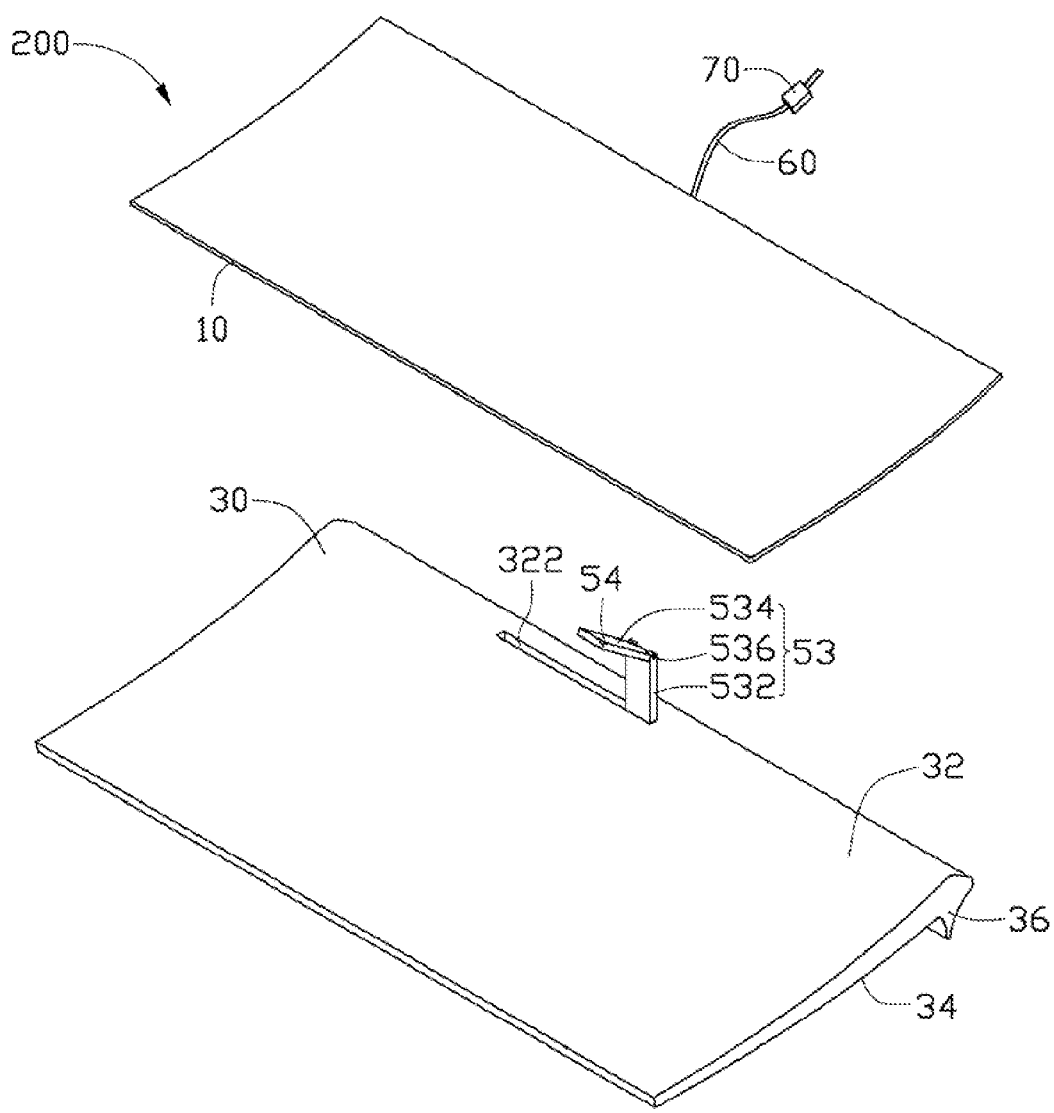
FIG. 6 is an exploded, isometric view of an input device of a second exemplary embodiment.

Referring to FIG. 6, an input device 200 is shown according to a second exemplary embodiment, differing from the first exemplary embodiment in that a collapsible holder 53 is provided rather than the single piece holder 52. The collapsible holder 53 includes a connecting portion 532, a fixing portion 534, and a connecting element 536. The fixing portion 534 pivots on the connecting portion 532 by the connecting element 536. In the second exemplary embodiment, the connecting element 536 can be a hinge, a shaft, or a pin. A sensor (not shown) is imbedded in the connecting element 536 to detect an angle between the connecting portion 532 and the fixing portion 534. The sensor detects the angle between the connecting portion 532 and the fixing portion 534 and is electrically connected to the control module 70. When the control module 70 receives the angle the sensor detects, the control module 70 selects a keyboard image for the projector 53 so that the lens 54 can project user's desired keyboard image according to the angle value between the fixing portion 524 and the connecting portion 522.

Figure 7:
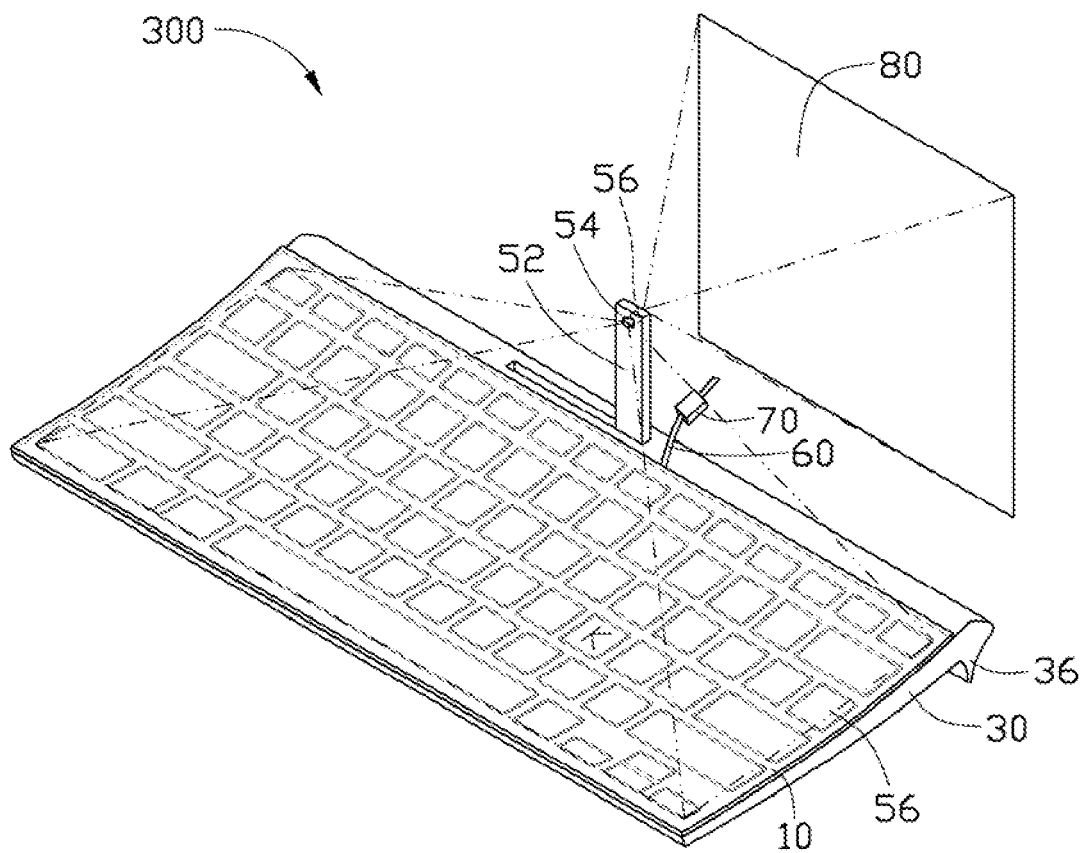
FIG. 7 is an assembled, isometric view of an input device of a third exemplary embodiment.

Referring to FIG. 7, an input device 300 is shown according to a third exemplary embodiment of the present disclosure, differing from the first exemplary embodiment only in that a second lens 56 is oriented at the free end of the holder 52 opposite to the lens 54. The second lens 56 is electrically connected to the electronic device by the cable 60. When the input device 300 and the electronic device are powered on, the lens 54 projects keyboard image on the touchscreen 10, and the second lens 56 projects images from the electronic device to a screen 80.

Figure 8:
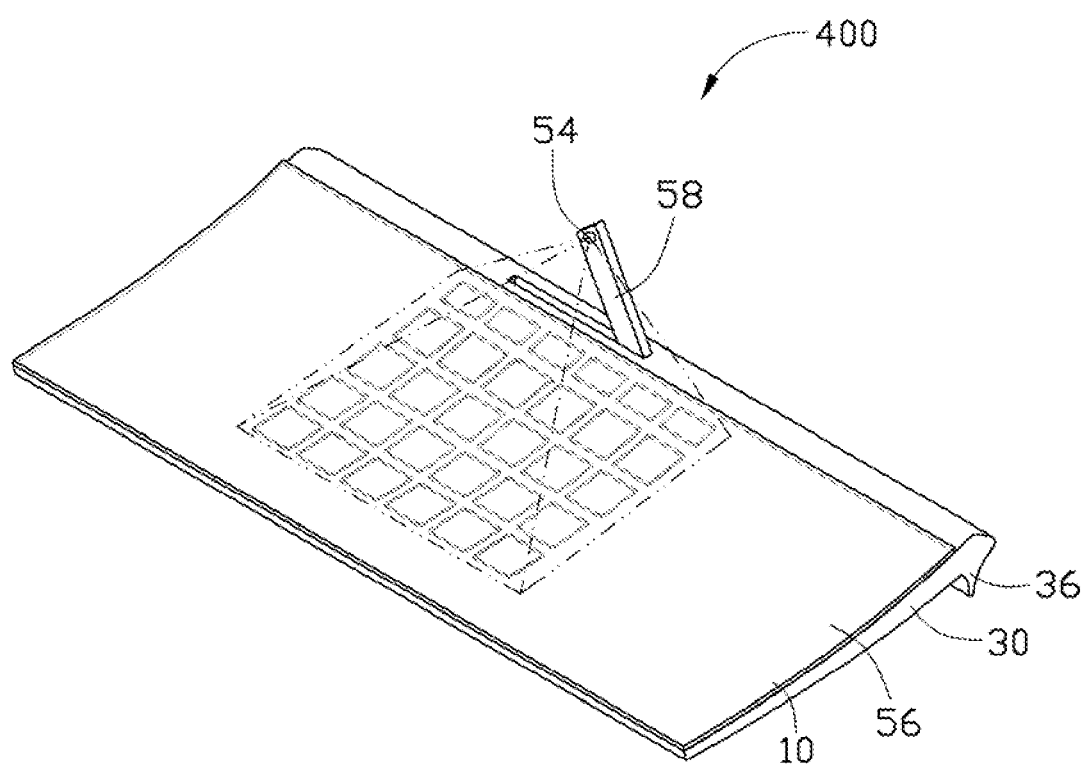
FIG. 8 is an assembled, isometric view of an input device of a fourth exemplary embodiment.

Referring to FIG. 8, an input device 400 is shown according to a fourth exemplary embodiment of the present disclosure, differing from the first exemplary embodiment only in that that a sensor is imbedded in a holder 58, replacing control module 70 secured to the cable 60. The sensor detects an angle between the base 30 and the holder 58. The lens 54 projects different keyboard images on the touchscreen 10 to identify input locations, such as a numerical keypad image as shown in FIG. 8 or a QWERTY keyboard image as shown in FIG. 4 in the first exemplary embodiment.

It is believed that the present exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary exemplary embodiments of the disclosure.

What is claimed is:

1. An input device comprising:
a base defining a receiving slot;
a touchscreen secured to the base; and
a projector including a holder supporting a lens, the holder pivotally connected to the base;
wherein the holder is a planar plate, and is pivoted out of the receiving slot perpendicular to the base, the lens projects a keyboard image on the touchscreen.

2. The input device as claimed of claim 1, further comprising a control module, the control module for selecting one of different keyboard images to be projected on the touchscreen.

3. The input device as claimed of claim 1, wherein the touchscreen is a transparent capacitive touchscreen.

4. The input device as claimed of claim 3, wherein the touchscreen includes a transparent protective layer, a first conducting layer, a transparent substrate, and a second conducting layer stacked on each in series.

5. The input device as claimed of claim 4, wherein the first and second conducting layers are either indium tin oxide, aluminum-doped zinc oxide, or cadmium oxide.

6. The input device as claimed of claim 1, wherein a leg portion projects from the base, the leg portion angles with the base.

7. The input device as claimed of claim 1, wherein the holder including a fixing portion and a connecting portion, the fixing portion is pivotally secured to the fixing portion, the lens is supported on the fixing portion, and the connecting portion is pivotally secured to the base.

8. The input device as claimed of claim 1, wherein a sensor is imbedded in the holder, the sensor detects an angle between the holder and the base, one of different keyboard images are projected on the touchscreen according the angle.

9. The input device as claimed of claim 1, wherein another projector is secured to the holder, the projectors are oriented at opposite sides of the holders.

10. An input device comprising:
a base;
a touchscreen secured to the base;
a holder, one end of the holder secured to the base; and
a lens, the lens secured to the other end of the holder, and the lens projecting a keyboard image on the touchscreen to identify input locations;
wherein the touchscreen is a transparent capacitive touchscreen, and includes a transparent protective layer, a first conducting layer, a transparent main body, and a second conducting layer stacked on each in series.

11. The input device as claimed of claim 10, further comprising a control module, the control module for selecting one of different keyboard images to be projected on the touchscreen.

12. The input device as claimed of claim 10, wherein the first and second conducting layers are either indium tin oxide, aluminum-doped zinc oxide, or cadmium oxide.

13. The input device as claimed of claim 10, wherein a leg portion projects from the base, the leg portion angles with the base.

14. The input device as claimed of claim 10, wherein the holder including a fixing portion and a connecting portion, the fixing portion is pivotally secured to the fixing portion, the lens is imbedded in the fixing portion, and the connecting portion is pivotally secured to the base.

15. The input device as claimed of claim 10, wherein a sensor is imbedded in the holder, the sensor detects an angle between the holder and the base, different keyboard images are projected on the touchscreen according the angle.

16. The input device as claimed of claim 10, wherein another projector is secured to the holder, the projectors are oriented at opposite sides of the holders.

* * * * *